United States Patent
Bröse et al.

(10) Patent No.: US 6,418,354 B1
(45) Date of Patent: Jul. 9, 2002

(54) OPTIMIZING THE BAND WIDTH AT THE BAND ENDS ON A MILL TRAIN

(75) Inventors: Einar Bröse, Erlangen; Michiaki Taniguchi, München; Thomas Martinetz, Wörth/Hofsingelding; Günter Sörgel, Nürnberg; Otto Gramckow, üttenreüth, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/297,230

(22) PCT Filed: Oct. 21, 1997

(86) PCT No.: PCT/DE97/02433

§ 371 (c)(1),
(2), (4) Date: Oct. 14, 1999

(87) PCT Pub. No.: WO98/17411

PCT Pub. Date: Apr. 30, 1999

(30) Foreign Application Priority Data

Oct. 23, 1996 (DE) .......................... 196 44 132

(51) Int. Cl.⁷ .............................. G06F 19/00
(52) U.S. Cl. ........................ 700/150; 700/48
(58) Field of Search ................ 700/154, 150, 700/145, 48, 122, 148; 72/8.3

(56) References Cited

U.S. PATENT DOCUMENTS

| | | | | |
|---|---|---|---|---|
| 4,248,072 A | * | 2/1981 | Hasegawa et al. | 700/150 |
| 4,570,472 A | * | 2/1986 | Kuwano | 72/10.1 |
| 5,085,065 A | * | 2/1992 | Onderka et al. | 700/151 |
| 5,193,066 A | * | 3/1993 | Konishi et al. | 700/154 |
| 5,414,619 A | * | 5/1995 | Katayama et al. | 700/150 |
| 5,740,686 A | * | 4/1998 | Martinetz et al. | 72/11.2 |
| 5,761,066 A | * | 6/1998 | Lettau et al. | 700/155 |
| 5,966,682 A | * | 10/1999 | Gramckow et al. | 700/155 |
| 6,098,060 A | * | 8/2000 | Yuan et al. | 706/21 |

FOREIGN PATENT DOCUMENTS

| | | |
|---|---|---|
| DE | 195 22 494 | 1/1996 |
| JP | 62 24 809 | 2/1987 |
| JP | 4 252302 | 9/1992 |
| JP | 06 023417 | 2/1994 |
| JP | 07 1 24 618 | 5/1995 |
| JP | 07 303909 | 11/1995 |
| WO | 96/01705 | 1/1996 |

OTHER PUBLICATIONS

Marinetz et al, "Neuronale Netze zur Steuerung von Walzstrassen," Automatisierungstechnische Praxis—ATP, vol. 38, No. 10, Pct. 1996, pp. 28, 30–32, 34–36, 41, 42. Listed in International Search Report.

(List continued on next page.)

Primary Examiner—Thomas Black
Assistant Examiner—Edward F. Gain, Jr. Baker Botts LLP
(74) Attorney, Agent, or Firm—

(57) ABSTRACT

The width of bands to be laminated on a mill train is adjusted by vertical upsetting rollers, resulting, however, in a narrowing at the band ends due to the asymmetric material flow there. In order to solve the problem, the upsetting rollers are so designed as to move at the passage of the band ends in keeping with a curve defined according to specified parameters. The parameters are based on neuro-computer made predictions related to the milling process.

24 Claims, 5 Drawing Sheets

OTHER PUBLICATIONS

Lindhoff et al., "Erfahrungen beim Einsatz neuronaler Netze in der Walzwerksautomatisierung," Stahl und Eisen, vol. 114, No. 4, Apr. 18, 1994, pp. 49–53, 208. Listed in International Search Report.

Umeda et al., "Application of Predictive Control Theory in Hot Strip Mill," Proceedings of the 1995 IEEE IECON: International Conference on Industrial Electronics, Control and Instrumentation, Orlando, Nov. 6–10, 1995 Signal Processing and Control, Robotics Vision and Sensors, Emerging Technologies and Factory Automation, vol. 2 of 2, Nov. 6, 1995, Institute of Electrical and Electronics Engineers, pp. 786–791, XP000559308. Listed in International Search Report.

Shaw et al., "LTV Steel Indiano Harbor Works' 85–IN. Hot Strip Mill Automatic Width Control Using Hydraulic Edger," Iron and Steel Engineer, vol. 71, No. 8, Aug. 1, 1995, pp. 43–51 XP000465244. Listed in International Search Report.

Preuss et al., "Neuro–Fuzzy," atp Automatisierungstechnische Praxis 36, 1994, 5, S. 11, 12, 14–18, 20–24. English abstract provided.

Siemens–Werbeschrift: "Ideas for Steel," PA6942.5. English translation provided, no date.

* cited by examiner

OPTIMIZING THE BAND WIDTH AT THE BAND ENDS ON A MILL TRAIN

FIELD OF THE INVENTION

The present invention relates to a method of optimizing the band width distribution at the end of a band passing through a mill train.

BACKGROUND INFORMATION

One of the main problems in rolling bands, for example, band steel, is achieving a basic rectangular shape with a width that is constant over the band length. Vertical upsetting rollers are used in the mill train to control the band width. If the upsetting rollers are operated with a constant setting, the band becomes usually narrower at the band ends, i.e., at the band head and the band foot, than in the mid-part due to The asymmetric material flow and other effects. In order to prevent this from occurring, the adjustment position of the upsetting rollers is adjustable during the passage of the band, the adjustment being widened with respect to the mid-part as the band ends pass through in the form of short excursions, also known as short strokes. This adjustment correction at the band head and band foot is performed according to a curve (Short Stroke Control-SSC curve), which can be defined by preset parameters.

SUMMARY

An object of the present invention is to produce a band width distribution at the band ends as close to the specified one as possible by providing a curve for the adjustment position of the upsetting rollers.

In In accordance with the present invention, the parameters for forming the curve according to which the position of the upsetting rollers is adjusted during the passage of the band ends are set on the basis of predictions concerning the rolling process using neural networks, with the prediction being continuously improved by on-line teaching of the neural networks on the rolling process. Preferably separate neural networks are used for the band head and the band foot. For consecutive passes of the same band, i.e., for several passes, separate neural networks may be used. If the number of passes is always the same, a single neural network can be used for determining the parameters of the curve of the upsetting rollers in the consecutive passes.

DETAILED DESCRIPTION

Figure 1:
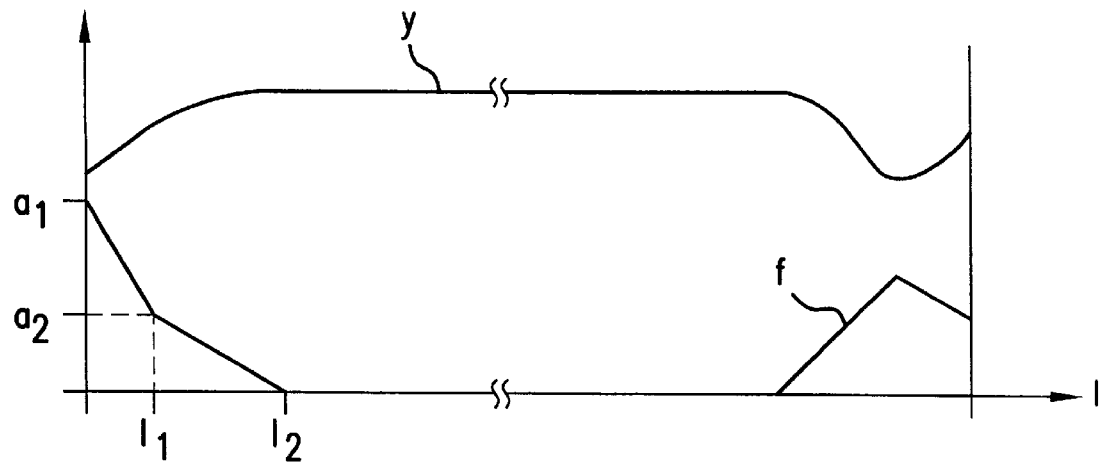
FIG. 1 shows an example of the width distribution of a rolled band and a curve derived therefrom for the upsetting rollers to correct the band width distribution to FIG. 2 shows an example of the control structure principle of a mill train having a unit for determining parameters for the definition of the curve to FIGS. 3 through 8 show different examples of implementation of the unit for determining the curve parameters to FIG. 9 shows a detailed diagram for determining the curve parameters based on the example of FIG. 8.

The diagram of FIG. 1 shows the exemplary width distribution y of a band over its length l when passing through a mill train having, in addition to horizontal flattening rollers for band thickness control, upsetting rollers for band width control. For constant upsetting roller adjustment, the band width is reduced at the band ends, i.e., at the band head and the band foot, due to asymmetric material flows in the band. In order to counteract this effect and maintain a rectangular band shape, the adjustment position of the upsetting rollers is adjusted as the band ends pass through following a curve f, composed of two straight-line segments in the example shown, which can be set for each pass of the same band and separately for the band head and the band foot. Curve f is described by four parameters in the form of two adjustment correction values $a_1$ and $a_2$ and two length coordinates $l_1$ and $l_2$. Adjustment correction values $a_1$ and $a_2$ refer to the roller gap, so that the travel of the two upsetting rollers is always one-half of that value. Of course, the curve can also be described in other ways and using more parameters.

Parameters $a_1$, $a_2$, $l_1$, and $l_2$ of curve f are to be determined so that, according to the curve defined by the parameters, an adjustment of the adjustment positions of the upsetting rollers results in a predefined specified band width distribution, which in this case is a rectangular band shape at the band ends. This is accomplished, as is elucidated in the following with reference to several examples, using neural networks, with individual parameters, here, for example, length coordinates $l_1$ and $l_2$, being also predefined as empirical values.

Figure 2:
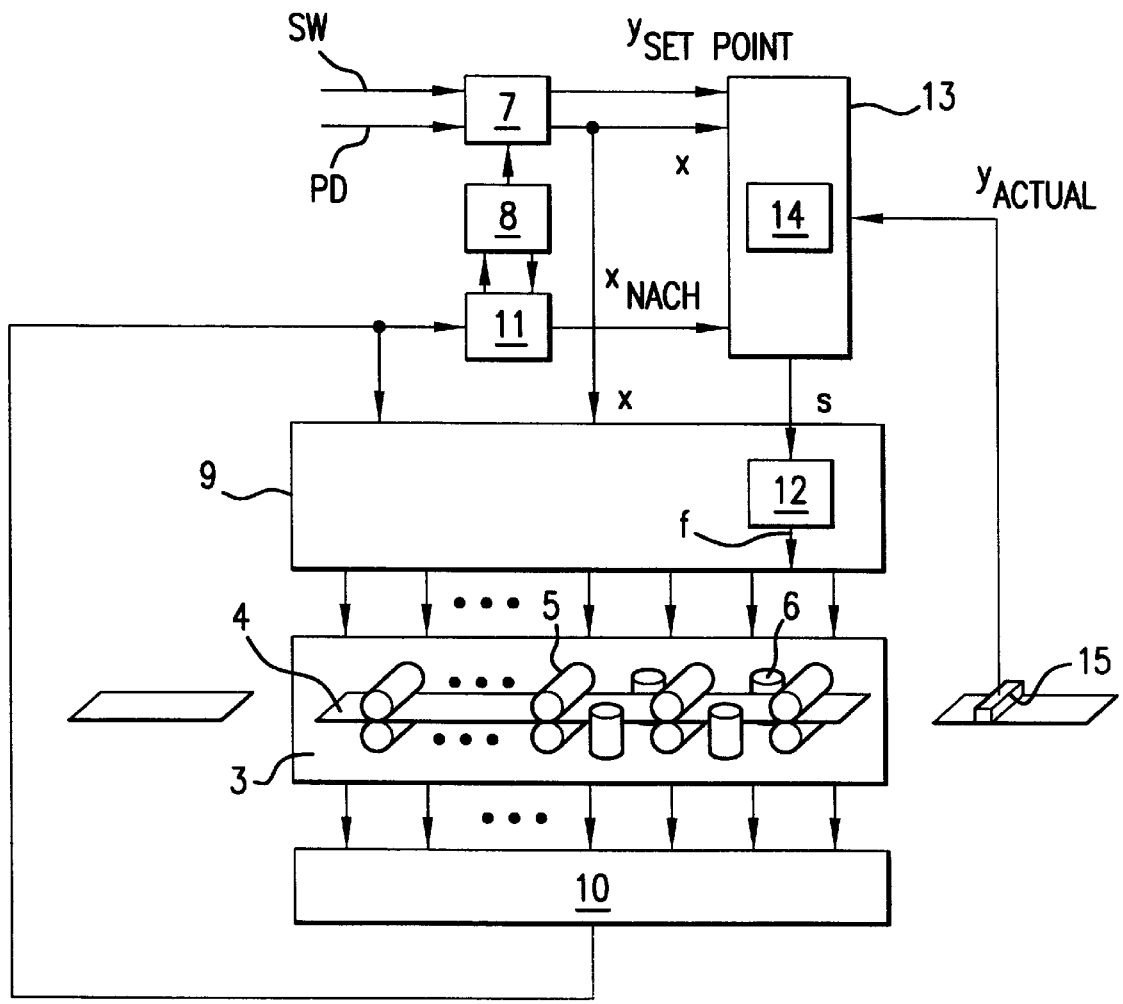

FIG. 2 shows the control structure principle of a mill train 3, in which the actual band width distribution $Y_{actual}$ of a band 4 passing through mill train 3 is optimized according to a predefined specified band width distribution $Y_{set\ point}$. Mill train 3 is a cogging train here, which has one or more horizontal roll stands with flattening rollers 5, with a vertical roll stand with upsetting rollers 6 being arranged upstream from each of the two last horizontal roll stands and, if needed, from other horizontal stands, here the last two horizontal stands. Before a band 4 enters mill train 3, relevant process parameters x of the rolling process are precalculated on the basis of specified values SW and primary data PD and using mathematical models 8 of the rolling process in a precalculating unit 7 and uploaded to a base automation unit 9, which uses these parameters to pre-adjust mill train 3. During the rolling process, relevant measured quantities of the rolling process are continuously detected using a measured value detection unit 10. The measured values are supplied to base automation unit 9 to perform control functions and to a recalculator 11. Recalculation 11 uses the same mathematical models 8 as precalculating unit 7 and adapts the respective model parameters on the basis of the measured quantities representing the actual course of the rolling process. Thus the precalculation is continuously improved and adjusted to the actual process for each subsequent band 4 to be rolled.

Basic automation unit 9 contains a suitable control device 12 for controlling the adjustment of upsetting rollers 6. Control device 12 generates, from parameters s supplied to it, for example, s=($a_1$, $a_2$) according to FIG. 1, a curve f, which is used to adjust the position of upsetting rollers 6 as the band ends pass through. Parameters s for curve f are determined in a unit 13 first as a function of predefined specified band width distribution $y_{set\ point}$ and precalculated process parameters x, using at least one neural network 14, which delivers a prediction on the upset variations at the band end. To improve and adapt the predictions of neural network 14 to the actual process, the actual band width distribution $Y_{actual}$ is measured at the discharge end of mill train 3 using a width measuring device 15, and neural network 14 is adjusted using this value and process parameters $X_{nach}$ recalculated in recalculator 11.

Regarding the number of neural networks 14 used, preferably separate neural networks are used for the band head and the band foot. In addition, separate neural networks may be used for successive passes of the same band 4. If, however, the number of passes is variable from one band to another the use of separate neural networks for the greater number of passes is disadvantageous, since in that case less training data is obtained.

Figure 3:
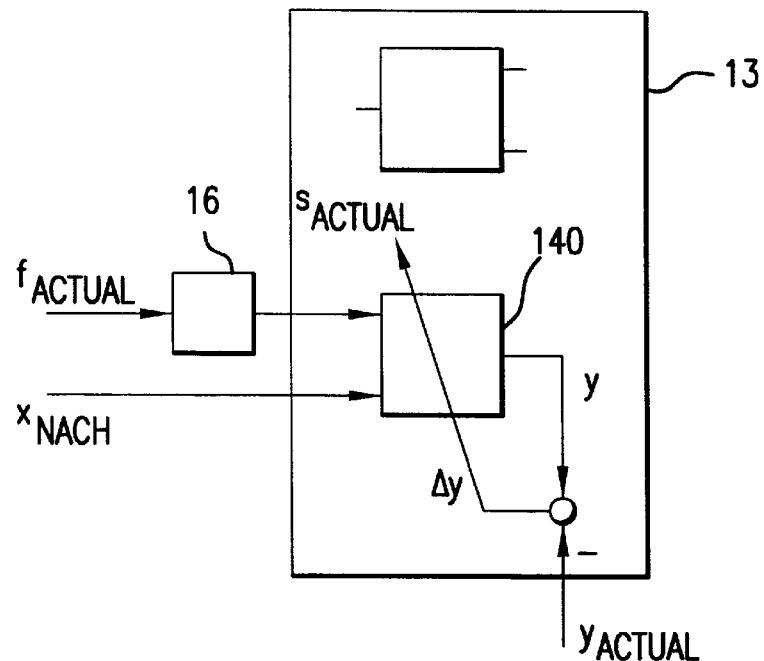
Figure 4:
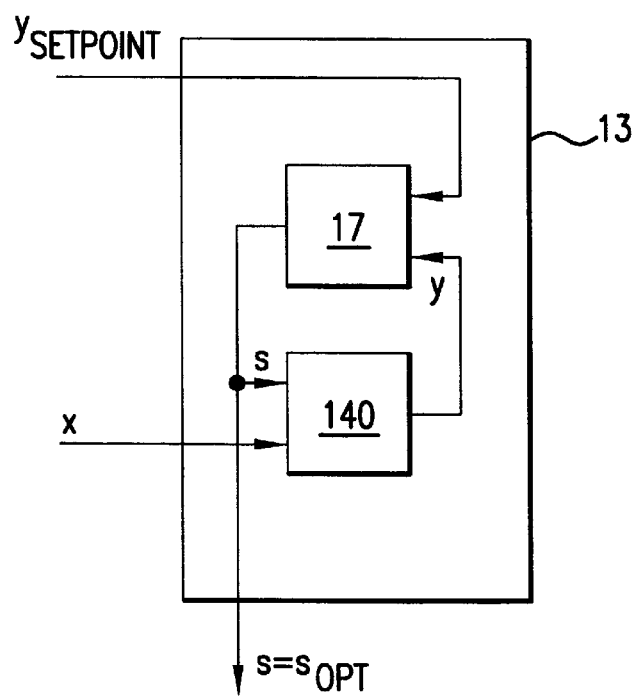

FIGS. 3 and 4 show a first exemplary implementation of unit 13 in two operating states. A neural forward model 140 is used here as a neural network, which mirrors the upset variation in its natural cause/effect relationship. The input parameters of neural network 140 in its training phase (FIG. 3) include the recalculated process parameters $X_{nach}$ and parameters $s_{actual}$ of the curve, which are determined from measured curve $f_{actual}$ using a recalculation unit 16, according to which upsetting rollers 6 are driven during the rolling process. Neural network 140 delivers a prediction for band width distribution y, which is compared with the measured actual band width distribution $y_{actual}$. Depending on the error Δy found in this comparison, neural network 140 is adjusted, so that it provides the most accurate possible prediction of band width distribution y achieved for the predefined parameters s of the curve and available process parameters x.

FIG. 4 shows how the optimum parameters $s_{opt}$ of a curve with which a predefined specified band width distribution yset point is achieved are determined. For this purpose, starting values $s_{start}$ for curve parameters s are first supplied to a computing unit 17 and sent to adapted neural network 140 together with the precalculated process parameters x. Adapted neural network 140 delivers a prediction for band width distribution y, which is compared with specified band width distribution $y_{set\ point}$. If the difference between the predicted band width distribution y and specified band width distribution yset point exceeds a predefined limit value, starting values $s_{start}$ are modified by an absolute value Δs. Using the new parameters $s=s_{start}+Δs$, neural network 140 delivers a new prediction for band width distribution y, which is again compared with specified bandwidth distribution $y_{set\ point}$. Parameters s for the curve are modified by an absolute value Δs stepwise until the difference between predicted band width distribution y and specified band width distribution yset pointno longer exceeds the predefined limit value.

Parameters s thus determined correspond to the optimum parameters $s_{opt}$ sought for the curve, with which the adjustment position of upsetting rollers 6 is controlled.

Figure 5:
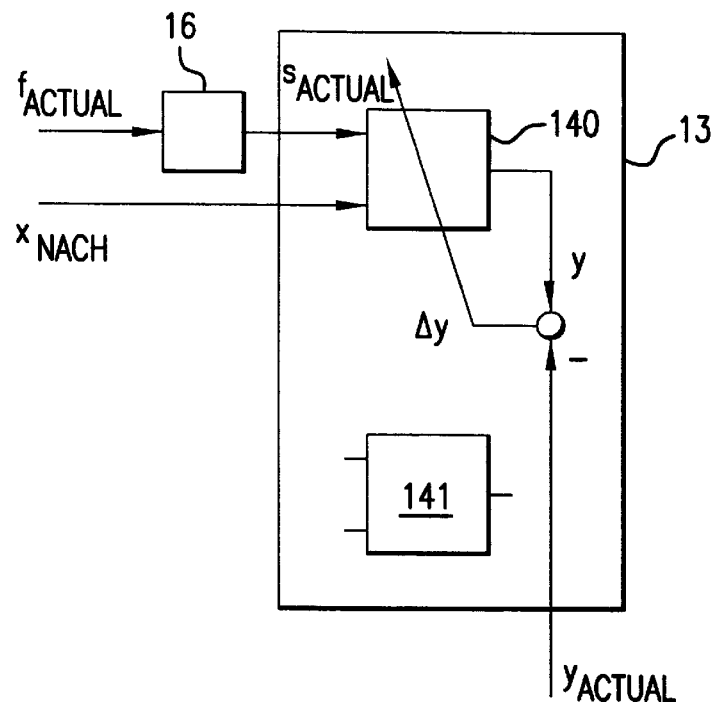
Figure 6:
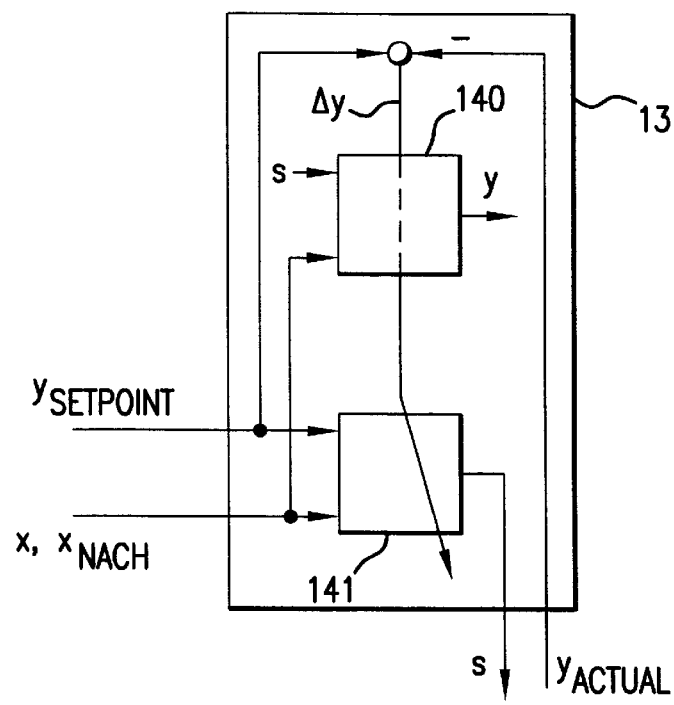

In the exemplary embodiment of unit 13 illustrated in FIGS. 5 and 6, two neural networks 140 and 141 are used, of which the first neural network 140 is a neural forward model as described in FIGS. 3 and 4, and second neural network 141 is a neural backward model describing the inversion of the natural cause/effect relationship. As shown in FIG. 5, in the first operating mode of unit 13, first neural network 140 is trained in the same manner as described with reference to FIG. 3.

According to FIG. 6, after completion of the training of the first neural network 140, a prediction of parameters s of the curve is generated by second neural network 141 on the basis of a predefined specified band width distribution yset point and the previously computed process parameters x, according to which upsetting rollers 6 are adjusted during the passage of the band. The resulting measured band width distribution yactualis compared to specified band width distribution $y_{set\ point}$; the error Δy obtained in this comparison is back-propagated by the adapted first neural network 140 and is used for adapting the variable network weights w($NN_{141}$) of the second neural network 141 by the gradient method:

$$\frac{\partial \Delta y}{\partial w(NN_{141})} = \frac{\partial \Delta y}{\partial y} \cdot \frac{\partial y}{\partial s} \cdot \frac{\partial s}{\partial w(NN_{141})}$$

Figure 7:
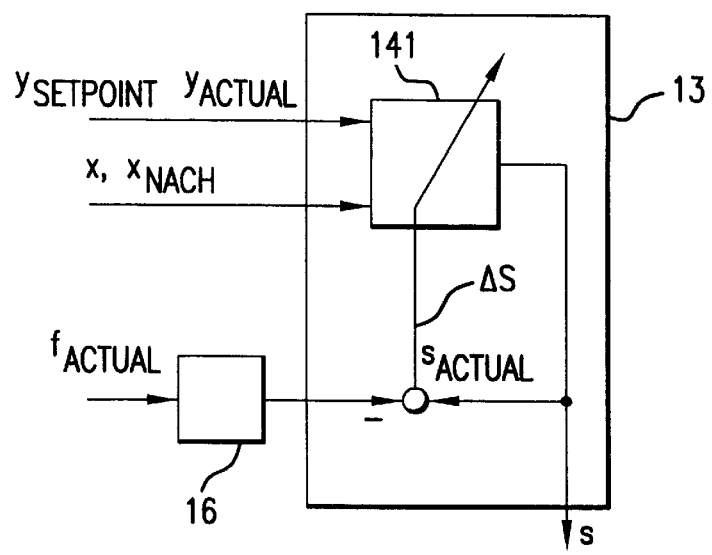

The embodiment shown in FIG. 7 for unit 13 includes a neural backward model 141 as a neural network like the one illustrated in FIGS. 5 and 6. This neural network 141, when adapted, delivers a prediction of parameters s of the curve as a function of a predefined specified band width distribution yset point the pre-calculated process parameters x according to which the position of upsetting rollers 6 is adjusted during the passage of the band.

To adapt neural network 141 to the actual, process, the measured actual band width distribution yactual and the recalculated process parameters $X_{nach}$ are supplied as inputs to neural network 141, whose network response s is compared with the actual curve parameters sactual determined from measured curve factual using recalculator 16. Neural network 141 is adapted depending on the error Δs obtained in this comparison.

Figure 8:
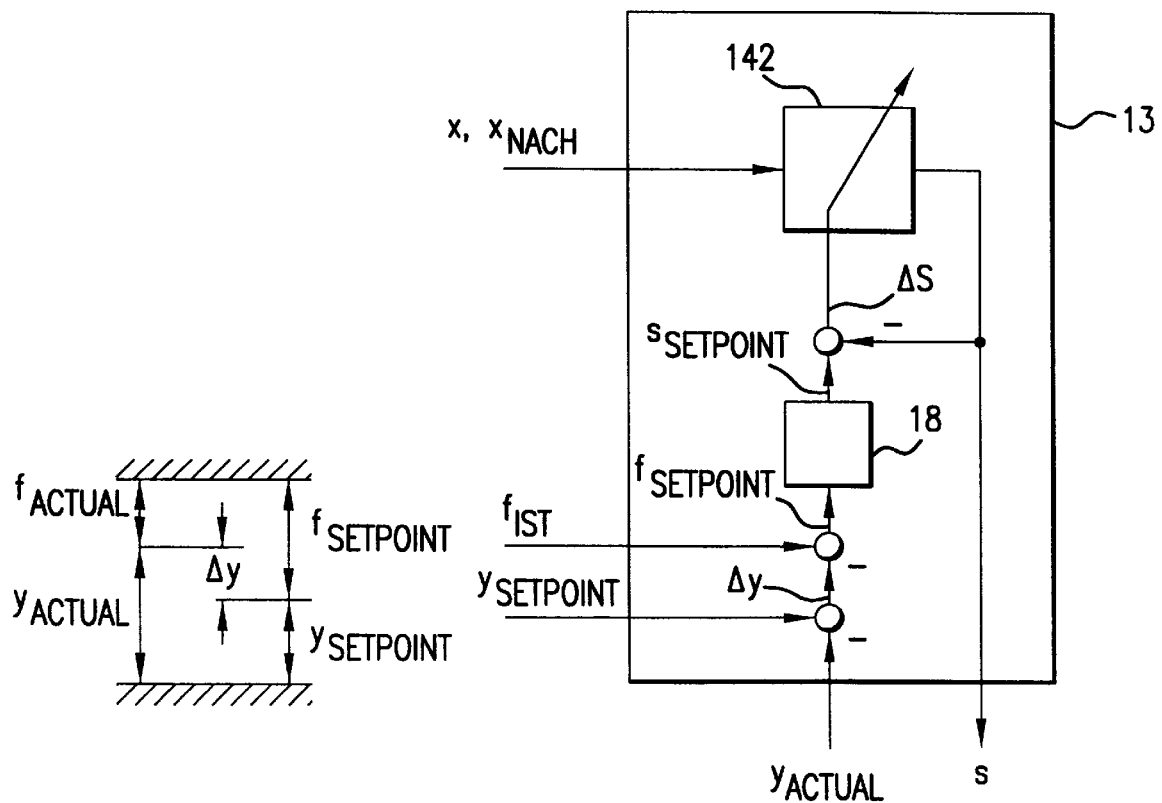

The embodiment of unit 13 shown in FIG. 8 is based on the fact that in the case of an error in band width distribution, i.e., of a difference Δy between specified band width distribution yset point and the measured actual band width distribution $y_{actual}$, curve factual for upsetting rollers 6 must be changed by the absolute value of this difference Δy in order to compensate for the error. Therefore a neural backward model can be used as a neural network 142. Specified band width distribution yset point established once for all, i.e., for a rectangular shape of the band ends, so that neural network 142 has a reduced set of functions compared to the examples described above, and only process parameters x or $x_{nach}$ are supplied to it as inputs for the prediction of curve parameters s.

Upstream from the band feed, neural network 142 delivers a prediction of parameters s of curve f based on pre-calculated process parameters x, on the basis of which upsetting rollers 6 are pre-adjusted.

After the passage of the band the desired specified band width distribution yset point is compared with the measured actual band width distribution $y_{actual}$. The measured curve factual is corrected, using the difference obtained Δy to yield a specified curve fset point, whose respective parameters Sset point are determined using a recalculator 18. Neural network 142 delivers, on the basis of the recalculated process parameters $x_{nach}$ supplied to it, a prediction of curve parameters s, which are compared with parameters S set point of the specified curve $f_{set\ point}$; the difference Δs obtained is used for the adaptation of neural network 142. The recalculation interface between curve f and its parameters s, which in the example shown is recalculator 18, can of course also be arranged otherwise in that parameters s predicted by neural network 142 are recalculated to yield a predicted curve f and the predicted curve f is compared with specified curve $f_{set\ point}$. This results also from the following example.

Figure 9:
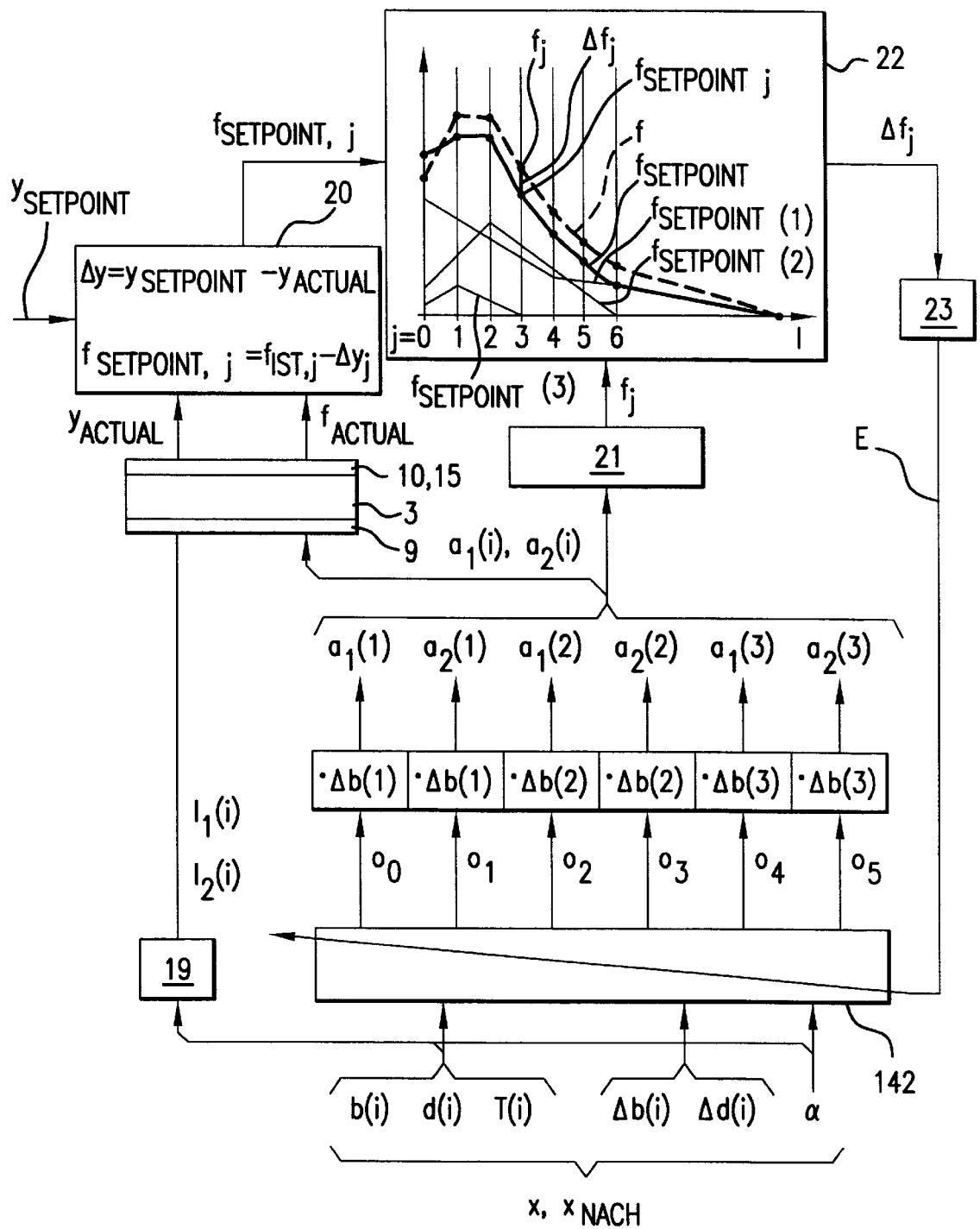

FIG. 9 shows a detailed diagram using the example illustrated in FIG. 8 for determining curve f of upsetting roller 6. As shown in FIG. 1, curve f(i) should be comprised for each of the total of three passes i(=1, 2, 3), of two straight-line segments, which are described by a total of four parameters $a_1(i)$, $a_2(i)$, $l_1(i)$, $l_2(i)$. Process parameters x and $X_{nach}$, which are relevant for determining curve f, include band width distribution b(i), band thickness d(i), and band temperature T(i) after each pass i, width reduction Δb(i) and thickness reduction Δd(i) of band 4 after each pass i, as well as a coefficient α as a measure of the material hardness (deformation strength) of band 4.

Curve parameters $a_1(i)$ and $a_2(i)$, i.e., the position correction values, are predicted for all three passes i by a neural network 142, which has six network outputs $o_k (=0 \ldots 5)$ for this purpose. Position correction values $a_1(i)$ and $a_2(i)$ are obtained as the product of network outputs $o_k$ located between −1 and +1 and the respective width reductions Δb(i) of band 4. As a result, none of position correction values $a_1(i)$ and $a_2(i)$ can be greater than the respective width reduction Δb(i).

Length coordinates $l_1(i)$ and $l_2(i)$ are determined by a device 19 as empirical values. Length coordinate $l_2(i)$, which corresponds to the length of the area of influence of upsetting rollers 6 in the first pass on band 4, is established as 3 times the slab width for the band head and as twice the slab width for the band foot, for example. For the subsequent passes, the length of the area of influence of upsetting rollers 6 is halved each time, so that $l_2(2)=½\, l_2(1)$ and $l_2(3)=½\, l_2(1)$. The other length coordinates are established as $l_1(i)=⅓\, l_2(i)$. The values thus determined for the length coordinates refer to band 4 after it exits from mill train 3 when the band width distribution is measured. To drive upsetting rollers 6 in the individual passes i, these values must therefore be recalculated in each pass to the band length upstream from each pass i compared to the length of band 4 after exiting mill train 3 due to the band stretch caused by mill train 3. This recalculation is performed on the basis of the temperature T(i), width b(i) and thickness d(i) of band 4 upstream from the respective pass i, the temperature, width and thickness of band 4 after exiting mill train 3 and the expansion coefficient α.

Curve parameters $a_1(i)$ and $a_2(i)$, predicted by neural network 142 on the basis of precalculated process parameters x, and curve parameters $l_1(i)$ and $l_2(i)$, predefined by unit 19, are supplied to base automation unit 9 to adjust mill train 3. In rolling band 4 in mill train 3, band width distribution yactual and curve factual of the upsetting rollers 6 are measured by measured value detection device 10 and width measuring device 15 at discrete points. First, error Δy between the predefined specified band width distribution $y_{set\ point}$ and the measured actual band width distribution yactual and then the specified curve $f_{set\ point}$ is computed from measured curve factualand error Δy in unit 20 at, in this case, seven predefined points j(=0 ... 6). Values $f_{set\ point,\ j}$ of specified curve $f_{set\ point}$ at these points are calculated as the sum of all passes i, i.e., specified curve fset pointis the sum of specified curves $f_{set\ point}(i)$ of the individual passes i.

On the basis of the recalculated process parameters $x_{nach}$ supplied to it after the passage of band 4 through mill train 3, neural network 142 delivers predictions on the position correction values $a_1(i)$ and $a_2(i)$, from which discrete values $f_j$ of the predicted position correction values $a_1(i)$ and $a_2(i)$ of predicted total curve f are calculated as the sum for all passes i in a unit 21 at joints j.

Error $\Delta f_j = f_{set\ point,j} - f_j$ is determined in a unit 22 by comparing discrete values $f_{set\ point,j}$ of the sum specified curve fset pointwith the discrete values $f_j$ of the predicted sum curve f. The squared error summed over all discrete points $$E = \frac{1}{2}\sum_{j=o}^{6} \Delta f_j^2$$

is formed from error $\Delta f_j$ in an additional unit 23 and is used to adapt neural network 142 by the gradient method.

As mentioned previously, mill train 3 of the embodiment shown in FIG. 1 is a cogging train. In order to also take into account the effect of the subsequent process lines, such as the finishing train and the cooling section, this effect is measured at the end of the cooling section and supplied to device 13 for determining curve parameters s.

What is claimed is:

1. A method of optimizing a band width distribution at ends of a band passing through a mill train, comprising the steps of:
   adjusting a position of upsetting rollers during the passage of the ends of the band according to a curve described by predefined parameters;
   predicting, using a neural network, a band width distribution as a function of process parameters of a rolling process of the mill train and the parameters of the curve;
   determining an error between the predicted band width distribution and a measured actual band width distribution;
   adapting the neural network as a function of the error to reduce the error;
   iteratively determining optimum values of the parameters of the curve using the adapted neural network for which a difference between the predicted band width distribution and a predefined specified band width distribution is minimum; and
   adjusting the position of the upsetting rollers as a function of the optimum values of the parameters of the curve.

2. The method according to claim 1, wherein the ends of the band include a band head and a band foot, separate neural networks being used for the band head and the band foot.

3. The method according to claim 1, wherein the curve for adjusting the position of the upsetting rollers includes two straight segments for each pass of a band end through the mill train, the straight segments being defined by two position correction values and two length coordinates in a direction of a length of the band, the length coordinates being predefined as empirical values, the position correction values forming the parameters of the curve.

4. The method according to claim 1, wherein a separate neural network is used for consecutive passes of the band through the mill train.

5. The method according to claim 1, wherein a same neural network is used for a fixed number of consecutive passes of a same band through the mill train.

6. The method according to claim 1, wherein the process parameters include a width of the band, a thickness of the band, a temperature of the band after each pass through the mill train, a width reduction of the band in each pass through the mill train, and a thickness reduction of the band in each pass through the mill train, and a measure for deformation strength of material of the band.

7. A method of optimizing a band width distribution at ends of a band passing through a mill train, comprising the steps of:
   adjusting a position of upsetting rollers during the passage of the ends of the band according to a curve described by predefined parameters;

predicting, using a neural network, the parameters of the curve as a function of process parameters of a rolling process of the mill train and a measured actual band width distribution;

determining an error between the predicted parameters of the curve and actual parameters of the curve according to which the position of the upsetting rollers was adjusted;

adapting the neural network as a function of the error to reduce the error;

determining optimum values of the parameters of the curve as a function of the process parameters of the rolling process and a predetermined specified band width distribution using the adapted neural network; and adjusting the position of the upsetting rollers as a function of the optimum values of the parameters of the curve.

8. The method according to claim 7, wherein the ends of the band include a band head and a band foot, separate neural networks being used for the band head and the band foot.

9. The method according to claim 7, wherein the curve for adjusting the position of the upsetting rollers includes two straight segments for each pass of a band end through the mill train, the straight segments being defined by two position correction values and two length coordinates in a direction of a length of the band, the length coordinates being predefined as empirical values, the position correction values forming the parameters of the curve.

10. The method according to claim 7, wherein a separate neural network is used for consecutive passes of the band through the mill train.

11. The method according to claim 7, wherein a same neural network is used for a fixed number of consecutive passes of a same band through the mill train.

12. The method according to claim 7, wherein the process parameters include a width of the band, a thickness of the band, a temperature of the band after each pass through the mill train, a width reduction of the band in each pass through the mill train, and a thickness reduction of the band in each pass through the mill train, and a measure for deformation strength of material of the band.

13. A method of optimizing a band width distribution at ends of a band passing through a mill train, comprising the steps of:

adjusting a position of upsetting rollers during passage of the ends of the band according to a curve described by predefined parameters;

predicting, using a first neural network, a band width distribution as a function of process parameters of a rolling process of the mill train and the actual parameters of the curve according to which the position of the upsetting rolling process and the actual parameters of the curve according to which the position of the upsetting rollers was adjusted;

determining a first error between the predicted band width distribution and a measured actual band width distribution;

adapting the first neural network as a function of the first error to reduce the first error;

predicting optimum values of the parameters of the curve as a function of the process parameters of the rolling process and a predefined specified band width distribution using a second neural network;

adjusting the position of the upsetting rollers as a function of the optimum values;

determining a second error between a specified band width distribution and the measured actual bandwidth distribution;

back-propagating the second error by the first neural network; and adapting the second neural network as a function of the second error to reduce the second error.

14. The method according to claim 13, wherein the ends of the band include a band head and a band foot, separate neural networks being used for the band head and the band foot.

15. The method according to claim 13, wherein the curve for adjusting the position of the upsetting rollers includes two straight segments for each pass of a band end through the mill train, the straight segments being defined by two position correction values and two length coordinates in a direction of a length of the band, the length coordinates being predefined as empirical values, the position correction values forming the parameters of the curve.

16. The method according to claim 13, wherein a separate neural network is used for consecutive passes of the band through the mill train.

17. The method according to claim 13, wherein a same neural network is used for a fixed number of consecutive passes of a same band through the mill train.

18. The method according to claim 13, wherein the process parameters include a width of the band, a thickness of the band, a temperature of the band after each pass through the mill train, a width reduction of the band in each pass through the mill train, and a thickness reduction of the band in each pass through the mill train, and a measure for deformation strength of material of the band.

19. A method of optimizing a band width distribution at ends of a band passing through a mill train, comprising the steps of:

adjusting a position of upsetting rollers during the passage of the ends of the band according to a curve described by predefined parameters;

predicting optimum values of the parameters of the curve, using a neural network, as a function of process parameters of a rolling process of the mill train;

adjusting the position of the upsetting rollers as a function of the optimum values;

determining a specified curve from a measured curve;

determining one of a first error and a second error, the first error being an error between the optimum values of the parameters of the curve and respective parameters determined from the specified curve, the second error being an error between a predicted curve determined from the optimum values and the specified curve; and adapting the neural network as a function of the one of the first error and the second error to reduce the one of the first error and the second error.

20. The method according to claim 19, wherein the ends of the band includes a band head and a band foot, separate neural networks being used for the band head and the band foot.

21. The method according to claim 19, wherein the curve for adjusting the position of the upsetting rollers includes two straight segments for each pass of a band end through the mill train, the straight segments being defined by two position correction values and two length coordinates in a direction of a length of the band, the length coordinates being predefined as empirical values, the position correction values forming the parameters of the curve.

22. The method according to claim 19, wherein a separate neural network is used for consecutive passes of the band through the mill train.

23. The method according to claim 19, wherein a same neural network is used for a fixed number of consecutive passes of a same band through the mill train.

24. The method according to claim 19, wherein the process parameters include a width of the band, a thickness of the band, a temperature of the band after each pass through the mill train, a width reduction of the band in each pass through the mill train, and a thickness reduction of the band in each pass through the mill train, and a measure for deformation strength of material of the band.

* * * * *